United States Patent
Anderson

(10) Patent No.: US 7,243,877 B1
(45) Date of Patent: Jul. 17, 2007

(54) TAPE REEL

(75) Inventor: James C. Anderson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/400,648

(22) Filed: Apr. 7, 2006

(51) Int. Cl.
*B65H 75/14* (2006.01)

(52) U.S. Cl. .................. 242/614; 242/608

(58) Field of Classification Search .......... 242/614, 242/348, 348.2, 608, 118.4; 360/132
See application file for complete search history.

(56) References Cited

U.S. PATENT DOCUMENTS

| | | | |
|---|---|---|---|
| 1,861,882 A * | 6/1932 | Ross | |
| 3,276,716 A * | 10/1966 | Hofbauer | |
| 3,295,783 A * | 1/1967 | Tatter et al. | |
| 3,330,496 A * | 7/1967 | Tatter et al. | |
| 3,556,433 A * | 1/1971 | Abitboul | |
| 4,564,411 A | 1/1986 | Holzer | |
| 4,932,600 A * | 6/1990 | Usui et al. | |
| 5,547,146 A * | 8/1996 | Kita | |
| 5,803,388 A * | 9/1998 | Saliba et al. | 242/348 |
| 2004/0140391 A1* | 7/2004 | Saliba | 242/614 |

* cited by examiner

*Primary Examiner*—William A. Rivera

(57) ABSTRACT

In one embodiment, a tape reel includes a hub and spaced apart opposing flanges extending out from the hub such that a tape may pass between inner surfaces of the flanges and wrap around the hub. The flanges have a cross section in which a rate at which a distance between the inner surfaces of the flanges increases is greater nearer to the hub and lesser farther from the hub.

21 Claims, 7 Drawing Sheets

TAPE REEL

BACKGROUND

When spooling tape onto a reel, it is desirable that the tape is packed as close as possible to the centerline of the tape path. Tape has a tendency to pack against one of the flanges. For any particular tape reel there are usually sections of the tape that pack against one flange and sections that pack against the other flange. Consequently, it is desirable to space the flanges as close together as possible so that the tape will pack along the centerline of the tape path. Closely spaced flanges, however, increase the risk that the edges of the tape will scuff against the flanges, damaging the tape and disturbing signals read from the tape.

In many conventional tape reels the flanges are tapered so that the inside surfaces facing the tape diverge from one another as they extend out from the hub. That is to say, the flanges are more closely spaced at the inner part of the reel near the hub than they are at the outer part of the reel farther from the hub. In some conventional tape reels the flanges are tapered along a straight line so that the rate at which the flanges diverge is the same along the length of each flange. In other conventional tape reels, the flanges are tapered along a curve so that the rate of taper varies from a lesser rate of taper at the inner part of the reel to a greater rate of taper at the outer part of the reel.

DRAWINGS

FIG. 1 shows computers networked to a tape drive.

FIGS. 2 and 3 illustrate one embodiment of a tape drive. FIG. 2 shows a tape cartridge partially loaded into the drive. FIG. 3 shows the tape cartridge fully loaded into the drive.

DETAILED DESCRIPTION

Embodiments of a new tape reel were developed in an effort to vary the rate at which the facing surfaces of the reel flanges diverge according to where the divergence is needed most to reduce the risk of scuffing the edges of the tape. The risk of scuffing can be reduced if the variation in the sum of the angle at which the edge of the tape intersects the flange surface and the angle between the actual tape path and the desired tape path is minimized, or contained within a desirable range, along the length of the flange surfaces. Embodiments of the new tape reel will be described with reference to the tape reels used in one example of a single reel type tape drive. Embodiments of the new tape reel, however, are not limited to use in the specific example of a single reel tape drive shown and described or to single reel tape drives in general.

Figure 1:
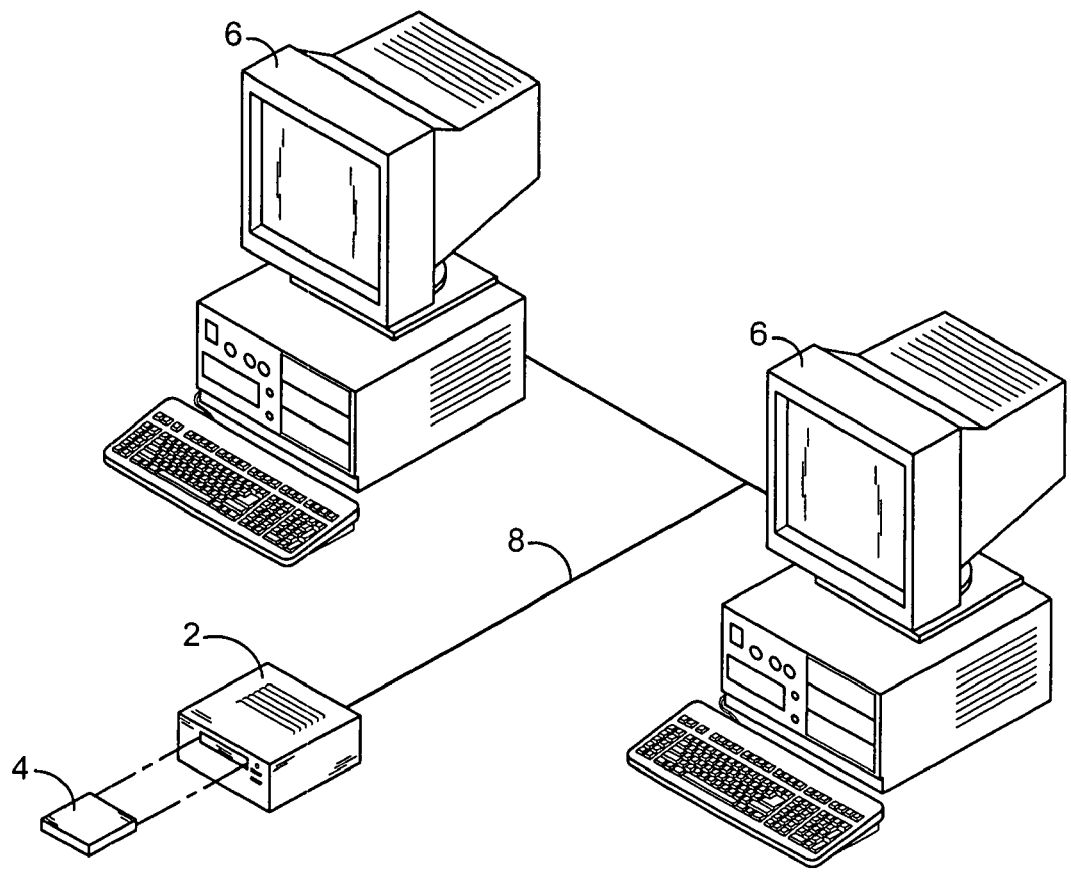
Figure 2:
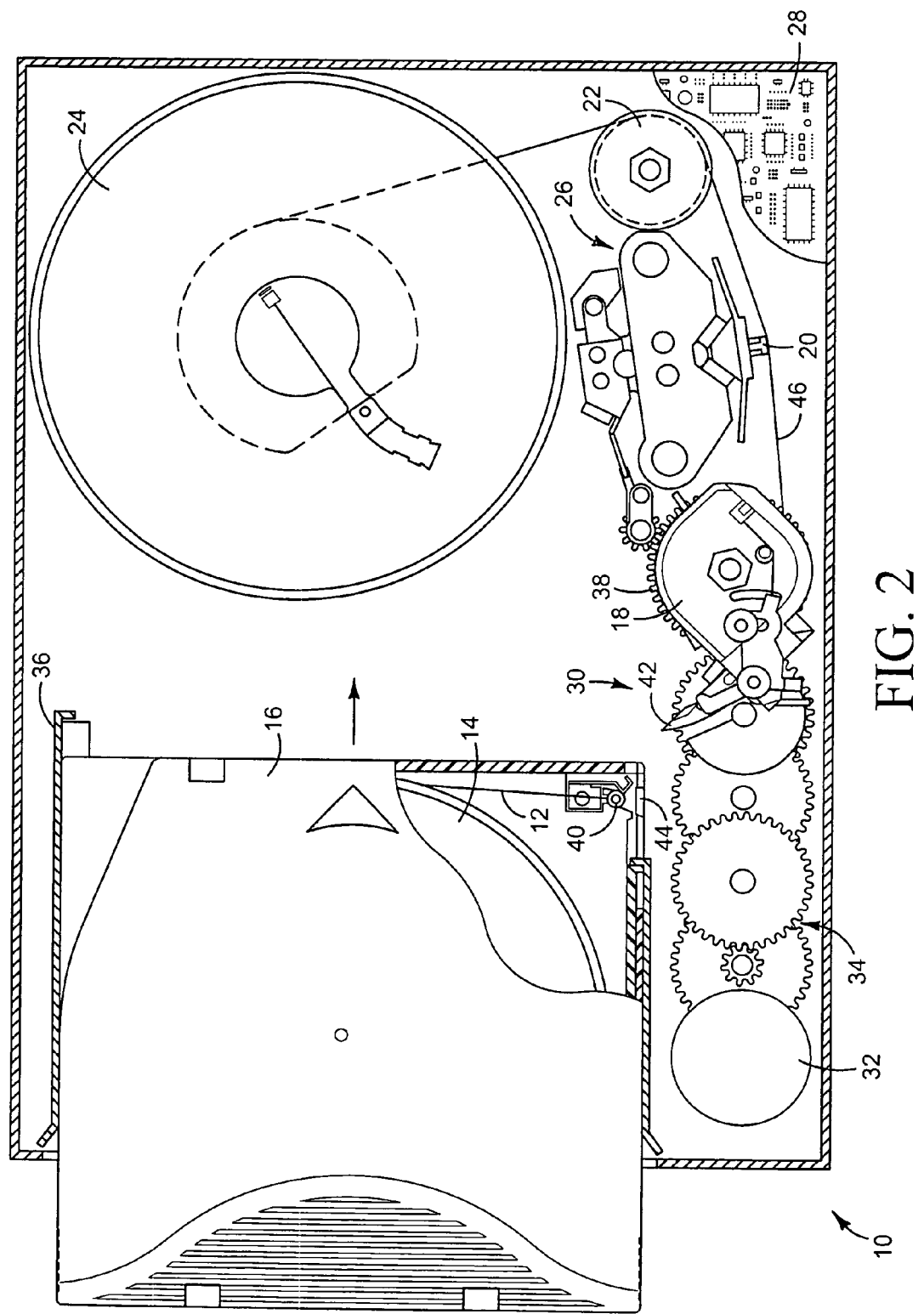
Figure 3:
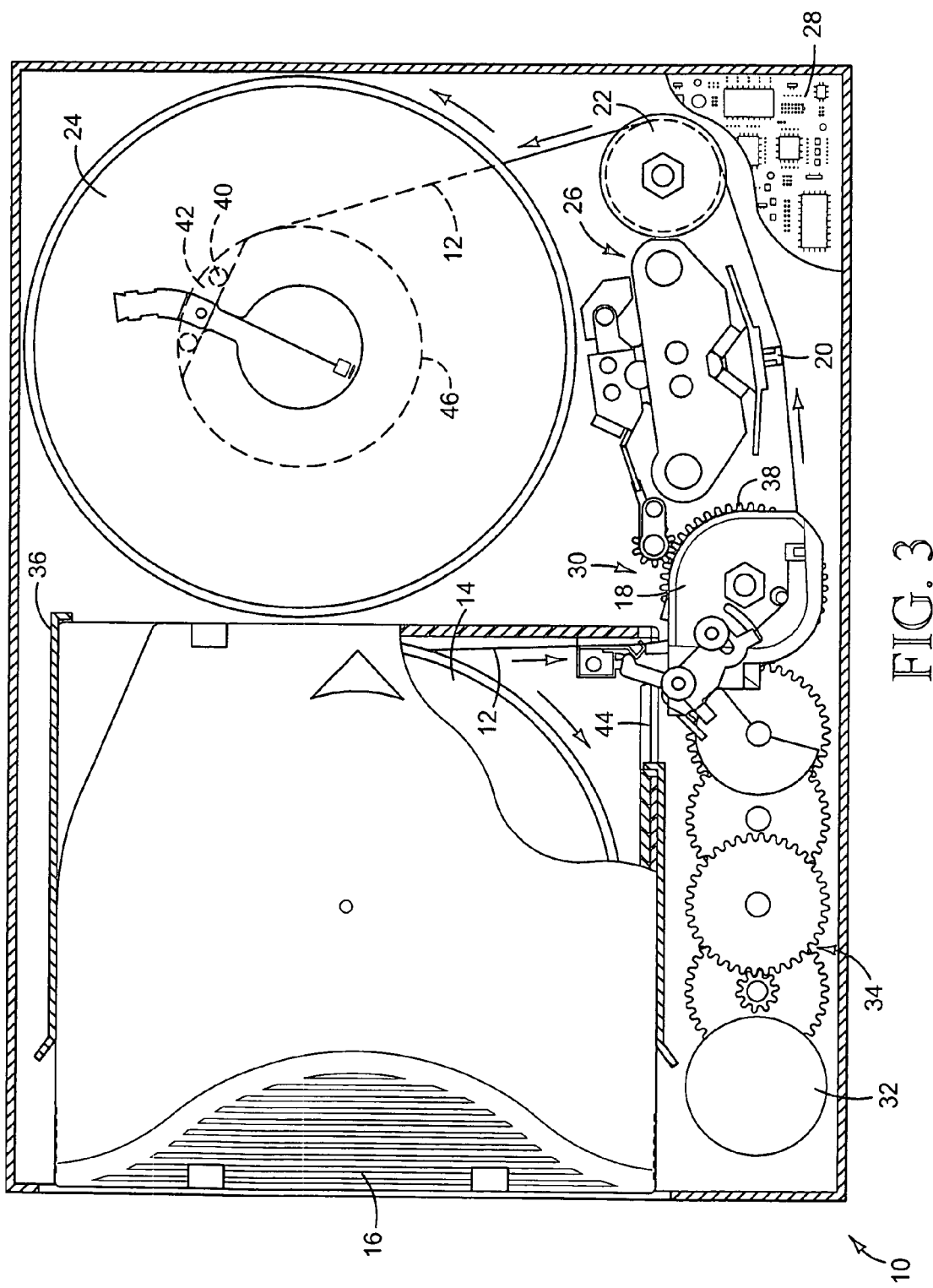

FIG. 1 illustrates a tape drive 2 with a removable tape cartridge 4 networked to computers 6 through a wired or wireless link 8. FIGS. 2 and 3 illustrate a single reel tape drive 10 such as might be used as tape drive 2 in the network of FIG. 1. In tape drive 10 in FIGS. 2 and 3, magnetic tape 12 is wound on supply reel 14 inside removable cartridge 16. FIG. 2 shows cartridge 16 partially loaded into drive 10. FIG. 3 shows cartridge 16 fully loaded into drive 10. When cartridge 16 is fully loaded into drive 10, as shown in FIG. 3, tape 12 passes through a threading unit 18, over head 20, around guide 22, to take-up reel 24.

Head 20 typically contains an array of elements that read and record information on tape 12. A "head" or "head element" as used in this document means a transducer that converts an electrical signal to the form required to record the signal to a medium (a write element), or reads a signal from a medium and converts it to an electrical signal (a read element), or both. Tape drives typically use magnetic head elements, where an electrical signal drives a time-varying magnetic field that magnetizes spots, or domains, on the surface of the magnetic tape. Head 20 is mounted to an actuator 26 which moves head 20 across the width of tape 12. An electronic controller 28 receives read and write instructions and data from a computer 6 (FIG. 1) or other host device. Controller 28, which may include more than one controller unit, includes the programming, processor(s) and associated memory and electronic circuitry necessary to control actuator 26, head 20 and the other operative components of tape drive 10. As actuator 26 carries head 20 back and forth across the width of tape 12, controller 28 selectively activates the head elements to read or record data on tape 12 according to instructions received from the host device.

Tape threading unit 18, which is sometimes also referred to as a pin grabber, is one component of a loading mechanism 30 that also includes a load motor 32, a drive train 34 and a cartridge tray 36. A grabber gear 38 is mounted to the bottom of grabber 18. When a tape cartridge 16 is inserted into tray 36, controller 28 energizes load motor 32 to move, through drive train 34, tray 36 along with cartridge 16 into position next to grabber 18. Motor 32 also drives grabber gear 38, through drive train 34, to rotate grabber 18 into cartridge 16 to capture a pin 40 on the end of tape 12 inside cartridge 16. Tape 12 is then threaded past head 20 to take-up reel 24. After tray 36 along with cartridge 16 is fully loaded, the continued rotation of grabber 18 moves a half-moon shaped capture part 42 (FIG. 2) on grabber 18 into an access window 44 on cartridge 16 to capture pin 40. Capture part 42 is attached to the end of a leader 46 connected to take-up reel 24. Once pin 40 is captured, controller 28 stops load motor 32 and energizes a take-up reel motor (not shown) to rotate take-up reel 24 counter-clockwise. The rotating take-up reel winds leader 46, capture part 42 and tape 12 onto take-up reel 24, as shown in FIG. 3.

Figure 4:
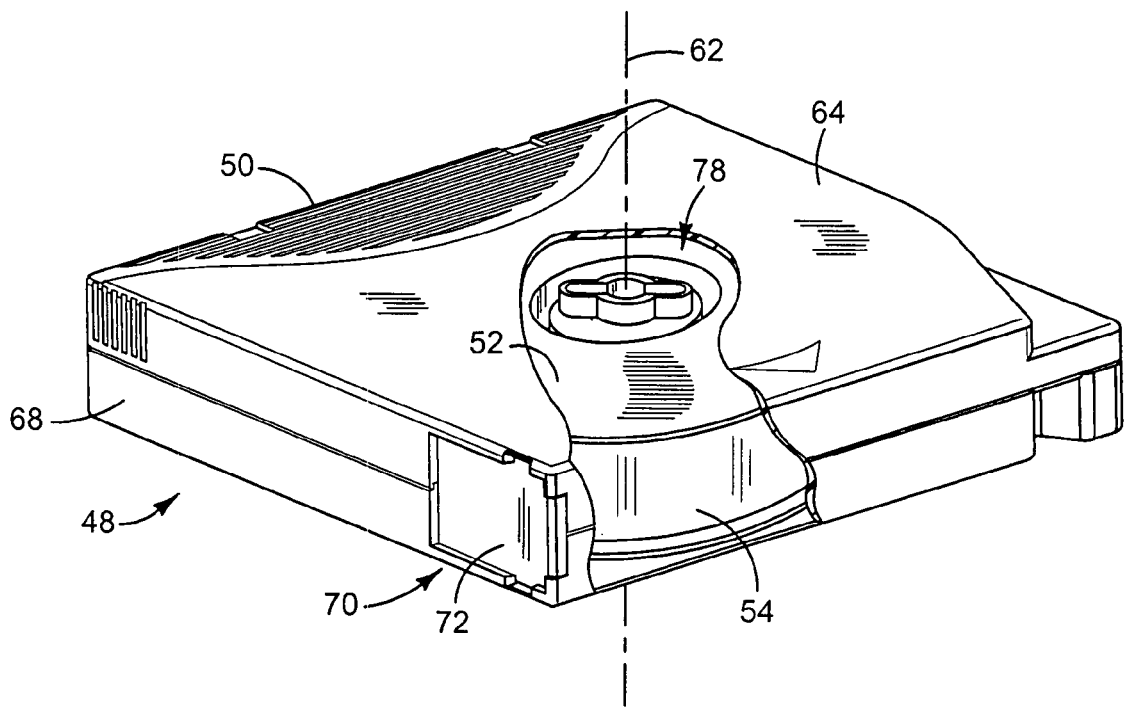
FIG. 4 is a perspective top side view of one embodiment of a single supply reel tape cartridge.
Figure 5:
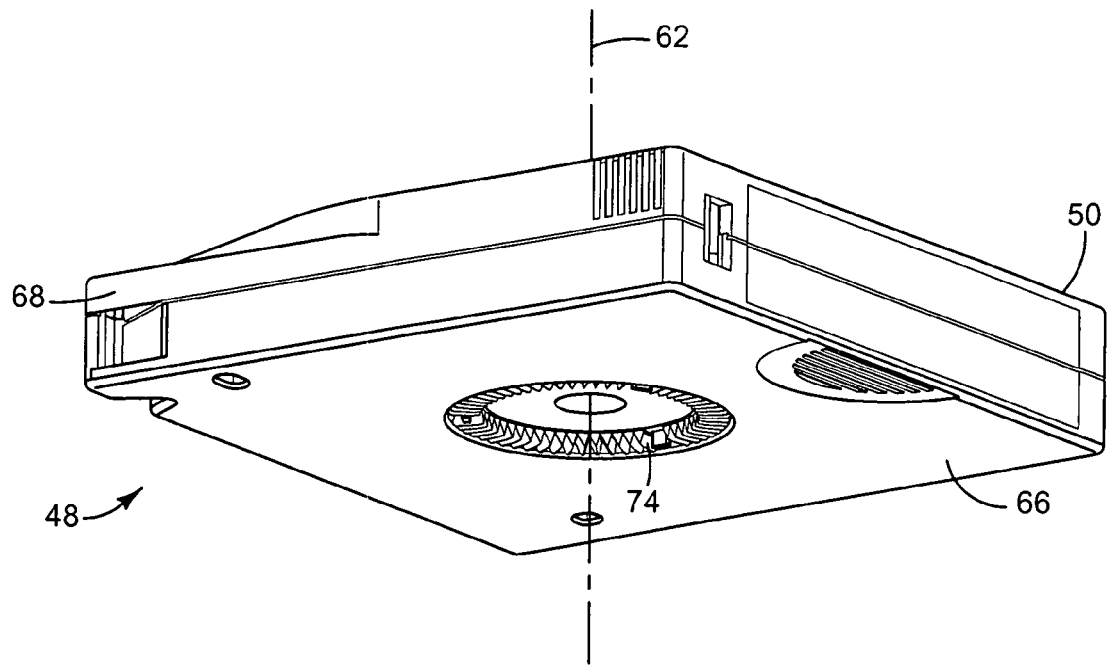
FIG. 5 is a perspective bottom side view of the cartridge of FIG. 4.
Figure 6:
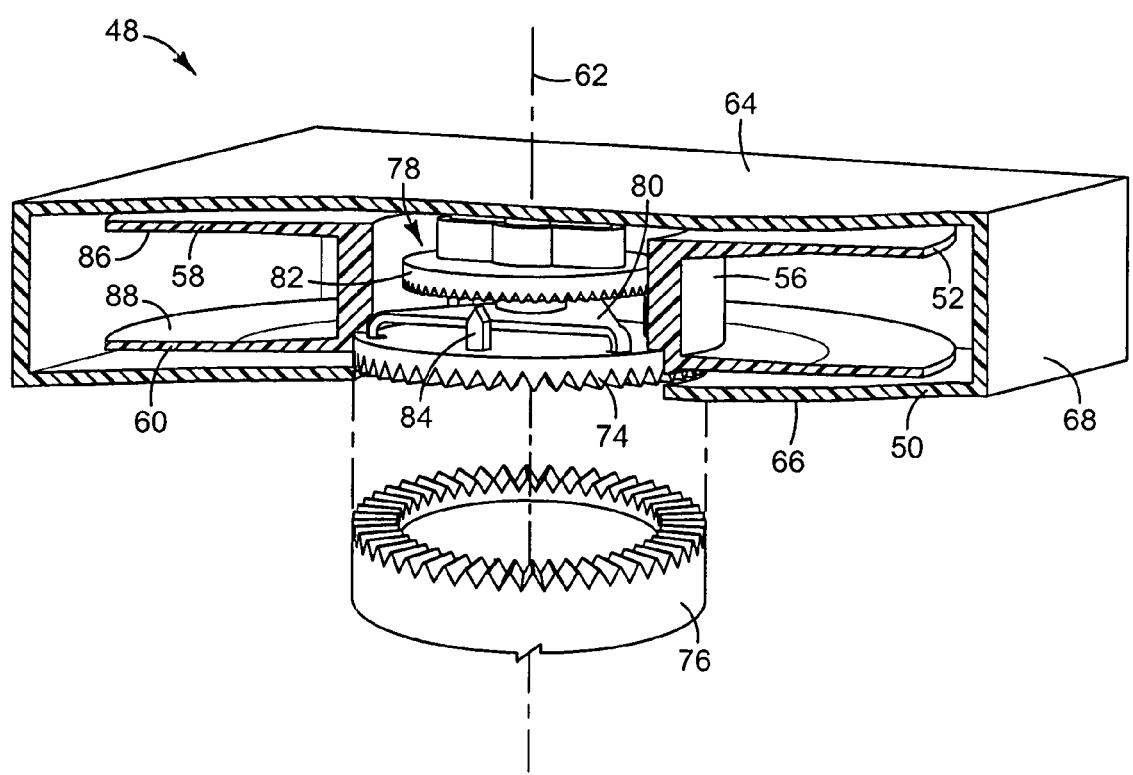
FIG. 6 is a section view of the cartridge of FIGS. 4 and 5.

FIGS. 4 and 5 illustrate a single supply reel tape cartridge 48 such as might be used as cartridge 16 in FIGS. 2 and 3. FIG. 6 is a section view of cartridge 48. Referring to FIGS. 4-6, cartridge 48 includes a housing 50, a tape supply reel 52 and tape 54. Tape 54 is omitted from FIG. 6. Reel 52 includes an annular hub 56 and disk shaped top and bottom flanges 58 and 60 extending out from hub 56.

As used in this document, "hub" means the center part of a rotatable object and "flange" means a rib or rim for guiding and/or for strength.

Although flanges 58 and 60 are depicted in FIGS. 4 and 6 as a continuous body extending circumferentially around and radially out from hub 56, other configurations are possible and, indeed, quite common. Some reel flanges, for example, are formed with openings in the flanges so that the flanges appear to have a series of spoke-like projections joined together by continuous circumferential portions at the hub and periphery. Other reel flanges are formed as a series of spoke-like projections out from the hub with no connecting circumferential parts around the periphery. The cross sections shown in FIGS. 7-10 and described below, which apply to all such configurations, are uniform all the way around the hub. For flanges that form a continuous body extending circumferentially around and radially out from the hub, the cross section will be the same at all locations around the hub. For flanges that are not continuous all the way around the hub, the cross section will be the same at those locations around the hub at which the flanges extend continuously from the hub to the outer periphery of the reel. In either case, and for purposes of this document, the cross section is said to be uniform around the hub. That is to say, the flange surfaces have the same relationship to one another at structurally similar locations all the way around the hub.

Reel 52 rotates about an axis 62 running through the center of hub 56. Housing 50 is a generally rectangular box-like structure configured to enclose a single reel of tape. Housing 50 includes a top 64, a bottom 66 and sidewalls 68 extending between top 64 and bottom 66. Tape 54 is accessible to a tape drive through an access window 70. A door 72 covers access window 70 when cartridge 48 is not installed in a tape drive. Door 72 is pushed open and held open when cartridge 48 is installed in a tape drive. A circular gear 74 is exposed through an opening in housing bottom 66. Gear 74, which is coupled to reel 52, provides the operative interface between the tape drive (not shown) and cartridge 48. Gear 74 is engaged by a mating coaxial gear 76 in the drive mechanism of the tape drive to rotate reel 52. A reel lock 78 includes spider washer 80, a locking gear 82 and locking posts 84 positioned at spaced apart locations around the top of reel gear 74.

Figure 7:
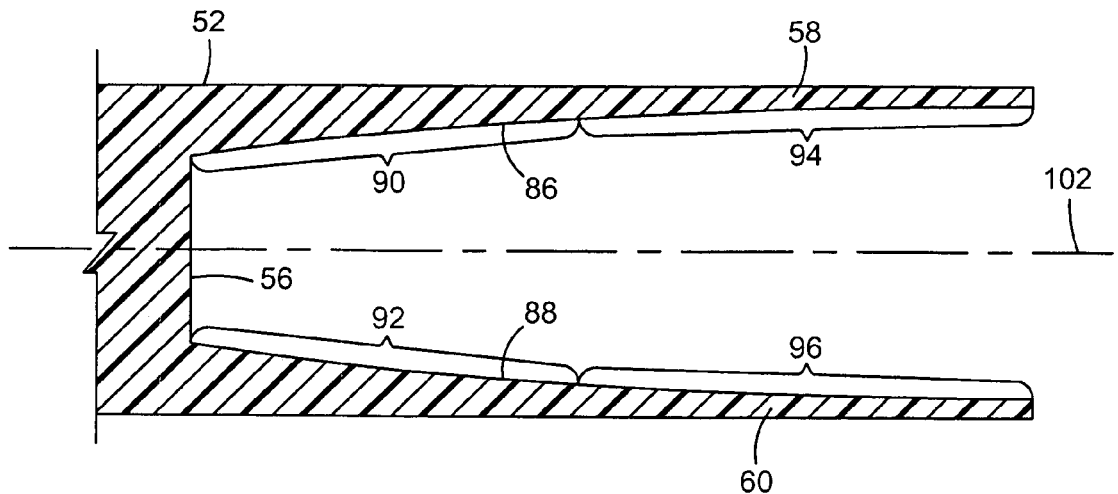
FIGS. 7 and 8 are detail views illustrating embodiments of reel flanges.
Figure 8:
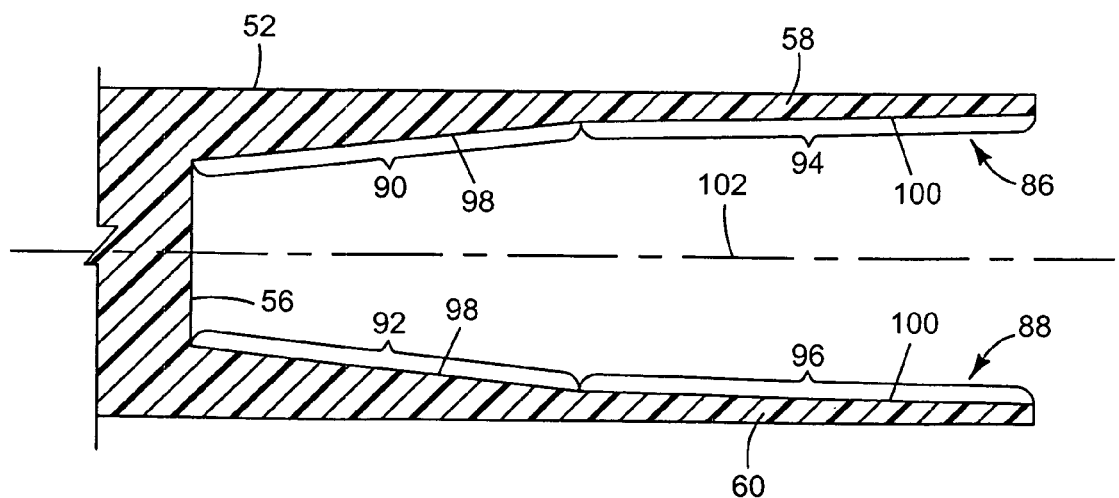

FIGS. 7 and 8 are detail section views illustrating two exemplary embodiments of reel flanges 58 and 60. The relative scale of some of the features depicted in FIGS. 7-10 is greatly exaggerated to better illustrate certain aspects of flanges 58 and 60. For example, the taper along each flange 58, 60 is really much smaller than that shown relative to the width of tape 54 and the length of flanges 58 and 60. Referring to FIGS. 7 and 8, top flange 58 defines an inner surface 86 facing an inner surface 88 defined by bottom flange 60. Flanges 58 and 60 are tapered so that the distance between surfaces 86 and 88 increases from a smaller distance near hub 56 to a greater distance near the end of flanges 58 and 60. That is to say, flange surfaces 86 and 88 diverge from one another in a direction radiating out from hub 56 and the axis of rotation of reel 52 (axis 62 shown in FIG. 6). The rate at which each flange 58, 60 tapers, and the corresponding rate at which surfaces 86 and 88 diverge from one another, is greater nearer hub 56 than it is farther from hub 56.

In the embodiments shown in FIGS. 7 and 8, each flange 58, 60 tapers at a first rate along an inner portion 90, 92 and at a second rate lesser than the first rate along an outer portion 94, 96. In the embodiment shown in FIG. 7, flanges 58, 60 taper along a curve defined by that part of an ellipse in which the radius of the curve is increasing from left to right (i.e., radially out from hub 56). The rate of taper of flanges 58 and 60 in FIG. 7, therefore, changes continuously along the length of each flange 58, 60 from a more steep inner portion 90, 92 (where the curve has smaller radii) to a less steep outer portion 94, 96 (where the curve has larger radii). For a continuous taper curve such as that shown in FIG. 7, the relative positions of inner portions 90, 92 and outer portions 94, 96 are somewhat arbitrary in the sense that the rate of taper is always lessening in a direction moving radially out from hub 56.

In the embodiment shown in FIG. 8, flanges 58, 60 taper along straight lines—a first line 98 along inner portions 90, 92 and a second line 100 along outer portions 94, 96. First line 98 slopes more steeply away from tape path centerline 102 than does second line 100.

Figure 9:
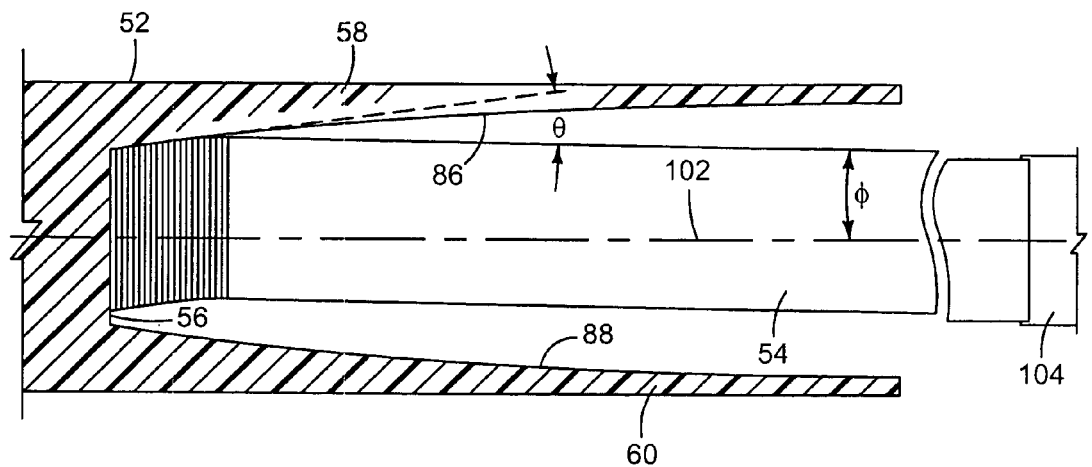
FIGS. 9 and 10 illustrate the reel flanges of FIG. 7 with a tape packing towards the inner part of the flanges near the hub (FIG. 9) and towards the outer part of the flanges away from the hub (FIG. 10).
Figure 10:
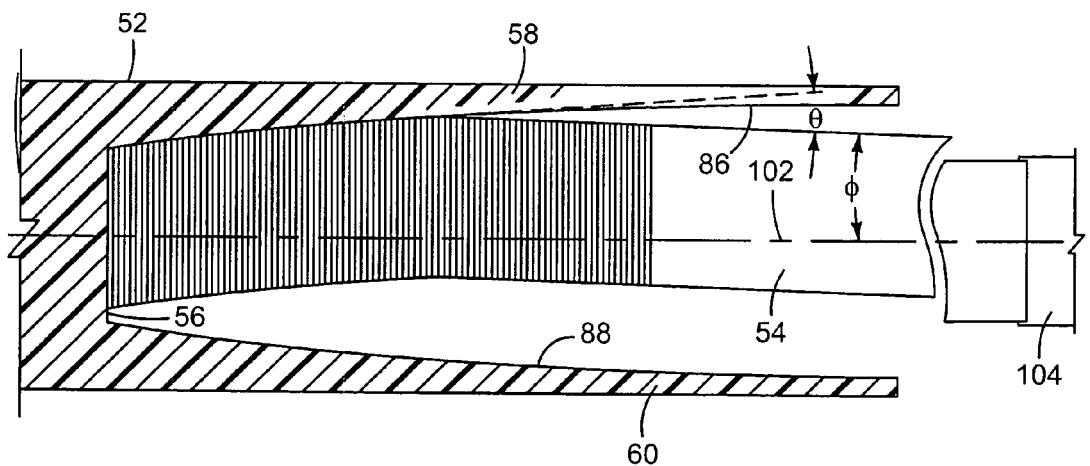

FIGS. 9 and 10 illustrate the reel flanges of FIG. 7 with tape 54 coming off a guide 104 and packing on the inner part of top flange surface 86 nearer to hub 56 (FIG. 9) and on the outer part of flange surface 86 farther from hub 56 (FIG. 10). In FIG. 9, tape 54 is packing onto reel 52 closer to hub 56 and farther from tape guide 104 where the angle θ at which the edge of tape 54 intersects flange surface 86 is relatively large and the angle φ between the actual tape path and the desired tape path is relatively small. In FIG. 10, tape 54 is packing onto reel 52 farther from hub 56 and closer to tape guide 104 where angle θ is smaller and angle φ is larger. Hence, the greater rate of divergence along the inner part of flanges 58 and 60 provides a larger angle θ where φ is smaller while the lesser rate of divergence along the outer part of flanges 58 and 60 provides a smaller θ where φ is larger.

Other embodiments are possible. For example, the rate of taper may change more than once over the length of the flange. For another example, the rate(s) of taper of top flange 58 may be different from the rate(s) of taper of bottom flange 60. Surfaces 86 and 88 do not run parallel to or converge on one another for any significant length. For another example, one or both flanges need not be tapered—the diverging surfaces could be formed along flanges having a uniform thickness.

Although the rate at which the surfaces diverge, the nature and number of changes in the rate of divergence, and whether or not the divergence is linear, curvilinear, or both, will vary depending on the particular application, it is expected that diverging surfaces in which between 60% and 90% of the total divergence occurs along the inner half of the length of the flanges will help maintain a desirable relationship between the angle at which the edge of the tape intersects the flange surface and the angle between the actual tape path and the ideal tape for the supply reel in a single reel tape cartridge and the take-up reel in single reel tape drive.

The present invention has been shown and described with reference to the foregoing exemplary embodiments. It is to be understood, however, that other forms, details and embodiments may be made without departing from the spirit and scope of the invention which is defined in the following claims.

What is claimed is:

1. A tape reel, comprising:
a hub;
a first flange having a first surface extending out from the hub;
a second flange having a second surface extending out from the hub opposite the first surface;
the first surface tapering away from the second surface at a first rate nearer to the hub and at a second rate lesser than the first rate farther from the hub.

2. The tape reel of claim 1, wherein the first and second surfaces taper away from one another at a first rate nearer to the hub and at a second rate lesser than the first rate farther from the hub.

3. The tape reel of claim 2, wherein the rate of taper changes continuously along each surface from a greater rate of taper near the hub to a lesser rate of taper near an edge of the flanges.

4. The tape reel of claim 2, wherein 60-90% of a total taper along a full length of the surfaces from the hub to a periphery of the flanges occurs within the first half of the length of the surfaces.

5. The tape reel of claim 1, wherein each surface comprises a continuous surface extending circumferentially around and radially out from hub.

6. The tape reel of claim 1, wherein the surfaces do not converge at any point.

7. A tape reel, comprising:

a hub; and spaced apart opposing flanges extending out from the hub such that a tape may pass between inner surfaces of the flanges and wrap around the hub, the flanges having a cross section in which a rate of increase of a distance between the inner surfaces of the flanges is greater nearer to the hub and lesser farther from the hub.

8. The tape reel of claim 7, wherein each inner surface comprises a continuous surface extending circumferentially around and radially out from hub.

9. The tape reel of claim 7, wherein the inner surfaces do not converge at any point.

10. The tape reel of claim 7, wherein the rate at which the distance between the inner surfaces increases changes continuously along each surface from a greater rate of increase near the hub to a lesser rate of increase near a periphery of the flanges.

11. The tape reel of claim 7, wherein 60-90% of a total increase in the distance between the inner surfaces along a full length of the inner surfaces from the hub to a periphery of the flanges occurs within the first half of the length of the inner surfaces.

12. A tape reel having an axis of rotation, the tape reel comprising a first surface extending away from the axis of rotation and a second surface extending away from the axis of rotation, the first and second surfaces facing one another and diverging away from one another at a greater rate nearer to the axis of rotation and at a lesser rate farther from the axis of rotation.

13. The tape reel of claim 12, wherein the first and second surfaces do not converge at any point.

14. The tape reel of claim 12, wherein the rate at which the surfaces diverge increases continuously from a greater rate of diverging near the hub to a lesser rate of diverging near a periphery of the flanges.

15. The tape reel of claim 12, wherein 60-90% of a total divergence of the surfaces along a full length of the surfaces from the hub to a periphery of the flanges occurs within the first half of the length of the surfaces.

16. A tape reel having an axis of rotation, the tape reel comprising a first surface extending away from the axis of rotation and a second surface extending away from the axis of rotation, the first and second surfaces facing one another and diverging such that an angle $\theta$ at which an edge of a tape intersects the first surface or the second surface is larger where an angle $\phi$ between an actual tape path and a desired tape path is smaller and the angle $\theta$ is smaller where the angle $\phi$ is larger.

17. A tape cartridge, comprising:

a housing;

a reel rotatably supported in the housing, the reel including a hub and spaced apart opposing flanges extending out from the hub such that a tape may pass between inner surfaces of the flanges and wrap around the hub, the flanges having a cross section in which a rate of increase of a distance between the inner surfaces of the flanges is greater nearer to the hub and lesser farther from the hub; and a tape drive interface operatively connected to the reel for rotating the reel at the urging of a drive mechanism.

18. The tape cartridge of claim 17, wherein the drive interface comprises a gear mounted to the hub.

19. A tape cartridge, comprising:

a housing;

a reel rotatably supported in the housing, the reel having an axis of rotation and the reel including a first and second surfaces extending away from the axis of rotation, the first surface and the second surface facing one another and diverging away from one another at a greater rate nearer to the axis of rotation and at a lesser rate farther from the axis of rotation; and a tape drive interface operatively connected to the reel for rotating the reel about the axis at the urging of a drive mechanism.

20. A tape drive, comprising:

a tape cartridge loading mechanism;

a take-up reel including a hub and spaced apart opposing flanges extending out from the hub such that a tape may pass between inner surfaces of the flanges and wrap around the hub, the flanges having a cross section in which a rate of increase of a distance between the inner surfaces of the flanges is greater nearer to the hub and lesser farther from the hub;

a head;

an actuator having a carriage carrying the head; and an electronic controller configured to receive read and record instructions and data from a computer or other host device and to control operation of the loading mechanism, the take-up reel, the actuator and the head.

21. A tape drive, comprising:

a tape cartridge loading mechanism;

a take-up reel having an axis of rotation, the reel including a first and second surfaces extending away from the axis of rotation, the first surface and the second surface facing one another and diverging away from one another at a greater rate nearer to the axis of rotation and at a lesser rate farther from the axis of rotation;

a head;

an actuator having a carriage carrying the head; and an electronic controller configured to receive read and record instructions and data from a computer or other host device and to control operation of the loading mechanism, the take-up reel, the actuator and the head.

* * * * *